July 14, 1964     E. F. VAN ARTSDALEN ETAL     3,140,659
METAL-COATED PROPELLANT GRANULES
Filed April 23, 1962

INVENTORS
EARL F. VAN ARTSDALEN
JOSEPH QUINLAN
BY ELWOOD J. VETTER

ATTORNEYS

United States Patent Office 3,140,659
Patented July 14, 1964

3,140,659
METAL-COATED PROPELLANT GRANULES
Earl F. Van Artsdalen, Joseph Quinlan, and Elwood J. Vetter, Philadelphia, Pa., assignors to the United States of America as represented by the Secretary of the Army
Filed Apr. 23, 1962, Ser. No. 189,653
2 Claims. (Cl. 102—38)
(Granted under Title 35, U.S. Code (1952), sec. 266)

The invention described herein may be manufactured and used by or for the Government for governmental purposes without the payment to us of any royalty thereon.

This invention relates to metal coated propellant masses and has for an object to enhance the strength of such masses against breakdown in smaller particles. Another object is to provide a moisture proof seal for propellant masses whereby the individual granules comprising the masses are sealed against ingress of moisture and egress of decomposition products instead of sealing the entire plurality of such masses within a container or cartridge case. Still a further object is to provide a method whereby granules of propellant may be symmetrically arranged within a cartridge case to be more closely and compactly arranged to enable more granules to be placed in a given size of cartridge case.

Heretofore the breakage of propellant masses into smaller particles has long been a problem affecting the ballistic utility of a propellant charge because when so broken the combustion rate of a given size mass of propellant is changed and becomes objectionably more rapid with an increase in surface area of the broken masses resulting in an excessive pressure in the products of combustion with an excessive velocity in the projectile. With this invention each propellant granule is reinforced by a metal casing thin enough to be permeable to a primer flame yet strong enough to be a reinforcement against breakage of the mass.

It has long been appreciated that a propellant should be kept sealed against the ingress of air and the egress of decomposition products. Heretofore such sealing has usually occurred with a group of granules of propellant within a cratridge case. According to the present invention the desired sealing is provided for each propellant granule by coating each particle with an electroless applied metal coating by dipping and coating in ways familiar. An especial advantage accrues when the metal coating is of nickel or other magnetic metal because it then becomes possible to arrange each granule symmetrically in a non-magnetic or in a non-magnetic and consumable cartridge case whereby the total propellant charge may be packed more tightly and compactly by having each granule arranged symmetrically and in parallelism to the others. This is done by relative longitudinal movement between a non-magnetic case and a magnet arranged to have its lines of force extend longitudinally within the cartridge case.

Referring to the drawing:

FIG. 1 discloses a conventional cartridge case and projectile for 30 caliber ammunition.

Figure 1:
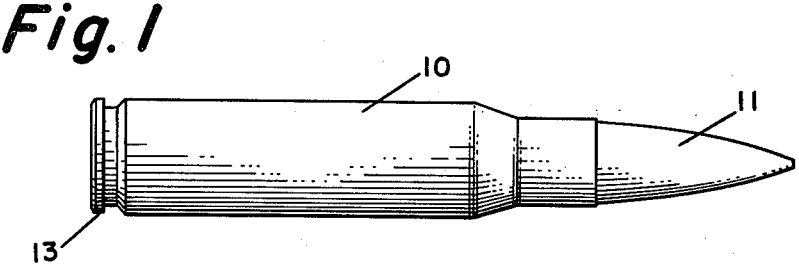

A standard 30 caliber round is shown in FIG. 1 in which the usual cartridge case 10 is of brass or other non-magnetic material and provided with a usual projectile 11 and a base flange 13 to assist in extracting the usual case from a chamber after being fired.

Figure 2:
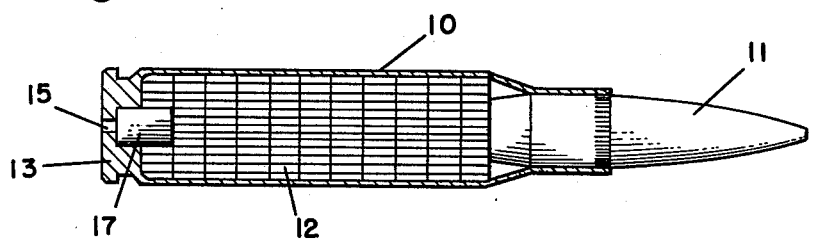
FIG. 2 is a section longitudinally through the round of FIG. 1 and showing how the propellant granules may be arranged symmetrically to obtain better packing of the propellant within a given space.

In FIG. 2 is shown a longitudinal cross section of the usual round of FIG. 1 except that the propellant granules have been coated with a magnetic metal such as nickel, providing a substantially moisture proof seal against the ingrees of moisture to the propellant and against the egress of decomposition products from burned granules. The granules 12 are each of standard size and material the only difference being the metal coating enclosing each granule on all sides and on the ends and hermetically sealing it.

Figure 3:
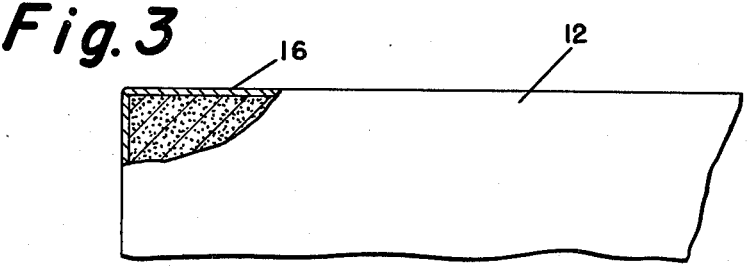
FIG. 3 shows a greatly enlarged corner of a propellant granule having the metal cover of this invention.

The metal coating is applied by the so-called electroless deposition process and is preferably of a nickel coating of a thickness of the order of .0008 of an inch thick. The thickness is determined in production by the duration of time provided for the deposition. The metal coating 16 of this invention is so thin that only a corner of a propellant granule is shown in FIG. 3. The first requisite of the coating is that it shall be thick enough to enable the granules 12 to be conformed to the direction of magnetic flux longitudinally of the cartridge case to enable these granules to be arranged in parallelism as shown in FIG. 2 in order that they may be symmetrically arranged and thus be more compactly placed in any case of given size. When greater strength to resist breakage is desired the coating may be made thicker. The upper limit of thickness capable of being melted for ignition of the propellant is not known. It is known however that the above stated thickness is ample to permit ignition of the propellant by the standard primer flame.

The case 10 in FIG. 2 is provided with small axial hole 15 in the base 13 through which a pin must enter for ignition of the usual primer 17. The cartridge case of this invention may be of consumable plastic or other non-magnetic materials. By the term nickel is meant commercial nickel. Tests have indicated that maximum pressure and the velocity of the issuing projectile are slightly lower than without the nickel coating, due perhaps to heat absorption by the latent heat of fusion of the metal and possibly also by the latent heat of vaporization. But this characteristic may be readily overcome by blending into the propellant granules a few percent of a more violent explosive than is now used. By the term "caseless round" is meant one that is either without a case or one which is consumable on ignition of the propellant.

We claim:

1. A small arms cartridge comprising a cartridge case of non-magnetic material, a projectile secured to said case, a plurality of propellant granules within said case, each of said granules having its entire exposed surface provided with a metal coating about .0008 inch thick of magnetic material sealing each of the granules separately against the ingress of moisture and against the egress of decomposition products, said coating enhancing the strength of all of the granules as a mass against fracture and breakage into smaller particles having a more rapid combustion rate, said granules being magnetically symmetrically arranged longitudinally within said case, whereby said round is more compactly loaded with propellant than would be possible were the granules asymmetrically arranged.

2. A small arms cartridge according to claim 1 in which said magnetic material is nickel.

References Cited in the file of this patent
UNITED STATES PATENTS

| | | |
|---|---|---|
| 1,036,176 | Bichel | Aug. 20, 1912 |
| 2,379,056 | Alexander | June 26, 1945 |
| 2,719,485 | Bendar | Oct. 4, 1955 |
| 2,982,211 | Beal et al. | May 2, 1961 |
| 3,010,399 | Manning | Nov. 28, 1961 |